(12) United States Patent
Boynton et al.

(10) Patent No.: US 7,152,168 B2
(45) Date of Patent: Dec. 19, 2006

(54) RECHARGING POWER STORAGE DEVICES WITH POWER OVER A NETWORK

(75) Inventors: Scott Anthony Boynton, San Jose, CA (US); Kenneth Craig Coley, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 493 days.

(21) Appl. No.: 10/636,135

(22) Filed: Aug. 6, 2003

(65) Prior Publication Data

US 2005/0033997 A1 Feb. 10, 2005

(51) Int. Cl.
*G06F 1/26* (2006.01)
(52) U.S. Cl. .................. 713/300; 379/713; 361/90; 307/66
(58) Field of Classification Search ................ 713/300; 379/413; 361/90; 307/66; 200/51
See application file for complete search history.

(56) References Cited

U.S. PATENT DOCUMENTS

| | | | |
|---|---|---|---|
| 6,538,344 B1 * | 3/2003 | Yang et al. ................ 307/66 |
| 6,546,494 B1 * | 4/2003 | Jackson et al. ............ 713/300 |
| 6,608,264 B1 * | 8/2003 | Fouladpour .............. 200/51.03 |
| 6,658,108 B1 * | 12/2003 | Bissell et al. ............. 379/413 |
| 6,714,977 B1 * | 3/2004 | Fowler et al. ............. 709/224 |
| 6,842,707 B1 * | 1/2005 | Raichle et al. ............ 702/62 |
| 2002/0145338 A1 * | 10/2002 | Stevens .................... 307/66 |
| 2003/0099076 A1 * | 5/2003 | Elkayam et al. ........... 361/90 |
| 2003/0126474 A1 | 7/2003 | Sawyers |

OTHER PUBLICATIONS

Patent Application of Luca Cafiero et al., U.S. Appl. No. 09/406,248 titled "Method and Apparatus for Remote Powering of Device Connected to Network" filed Sep. 27, 1999 (12 pages).
802.3af-2003 IEEE Standard for Information Technology, Part 3: Carrier Sense Multiple Access with Collision Detection (CSMA/CD) Access Method and Physical Layer Specifications; Amendment: Data Terminal Equipment (DTE) Power via Media Dependent Interface (MDI) (Jun. 18, 2003) (132 pages).
Red Hawk/CDT, "PowerSense: Modular Mid-Span In-Line Power Hubs" Online! Jul. 2003, Red Hawk/CDT, US, XP-002304181, URL:http://www.red-hawk.com/pdf/PowerSense
Training_July_2003.ppt—retrieved on Nov. 2004, p. 5-28.

* cited by examiner

*Primary Examiner*—Thomas Lee
*Assistant Examiner*—Sean Weinman
(74) *Attorney, Agent, or Firm*—Marger Johnson & McCollom, P.C.

(57) ABSTRACT

A network device is disclosed. The network device includes an incoming power port, an outgoing power port, an internal circuit, and a power storage system connected to the incoming power port, the outgoing power port and the internal circuit. In alternative embodiments, the device may include a power regenerator, a power detector and divider, or a power splitter.

15 Claims, 4 Drawing Sheets

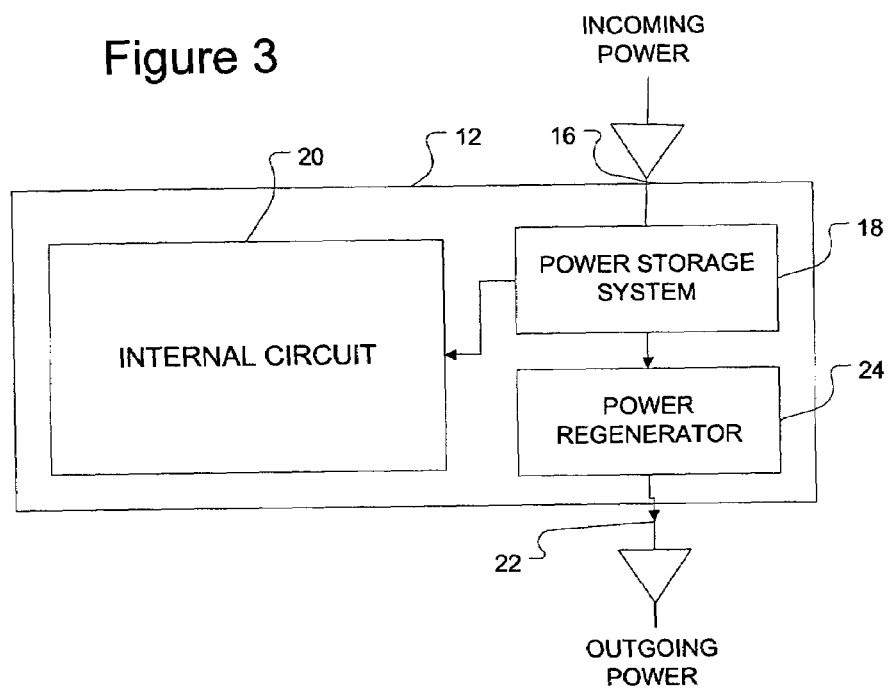
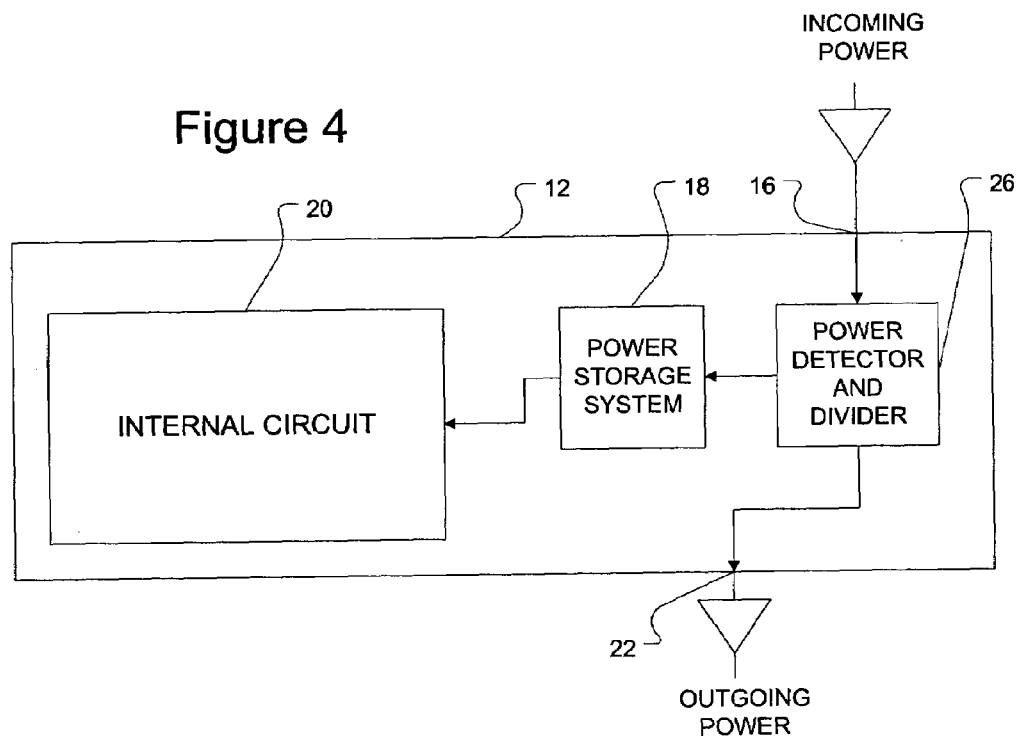

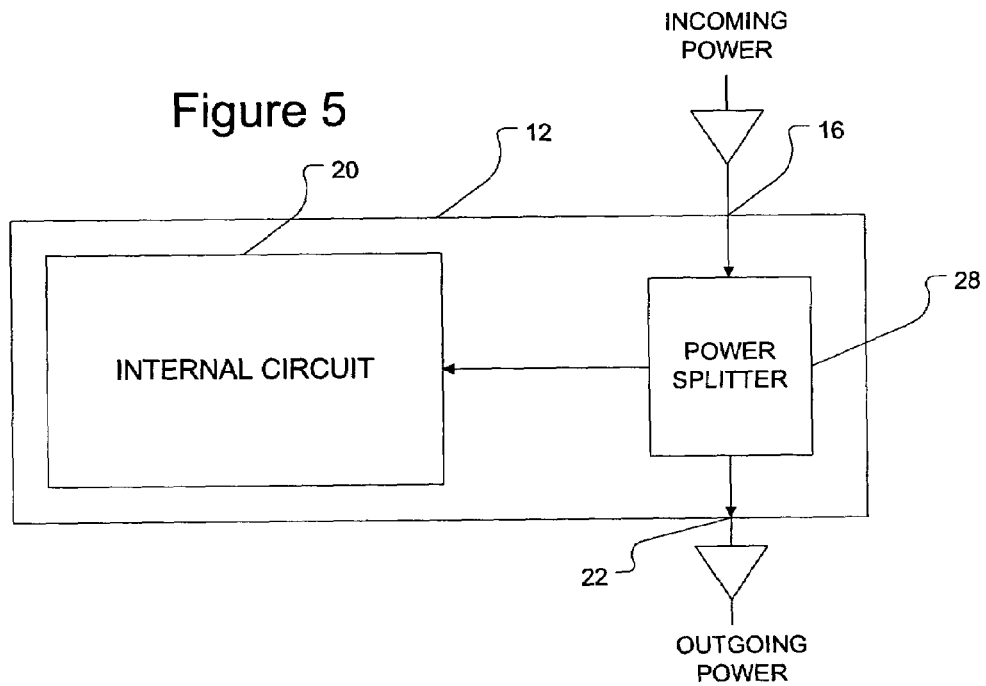
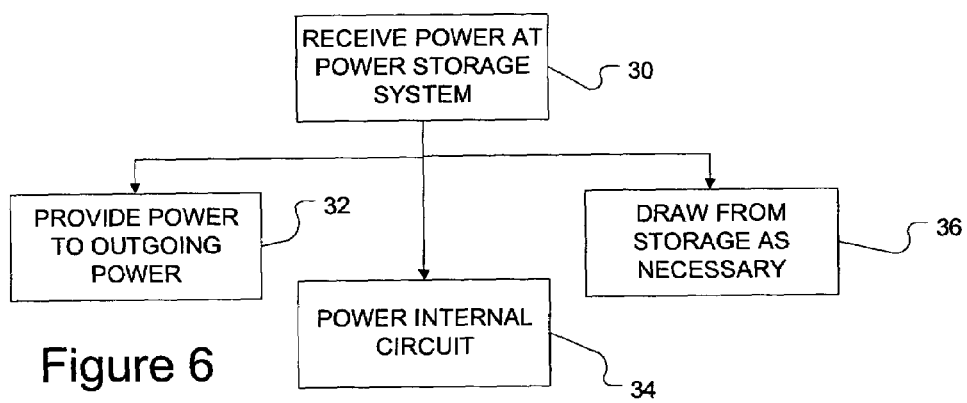

RECHARGING POWER STORAGE DEVICES WITH POWER OVER A NETWORK

BACKGROUND

Until recently, network devices required their own individual power supplies, either internal or external, connected to a power outlet. The introduction of the ability to deliver 7.5 Watts of power over a Category 5 (Cat 5) Ethernet cable with simultaneous transmission of data spawned the ability to provide both power and network connection to network devices. "Ethernet" is the term used for a specific local area network (LAN) architecture that is set forth in the Institute of Electrical and Electronic Engineers (IEEE) standard 802.3. A Cat 5 cable is a cable comprised of four twisted pairs of copper wires terminated with RJ45 connectors. The network devices that may take advantage of this power include Voice of Internet Protocol (VoIP) phones, wireless access points, and web cameras, among many others. The transmission of power through the Cat 5 cable is also referred to as Power over Ethernet, or PoE.

An even newer innovation is the ability to provide power up to 15.3 W, set out in the IEEE standard 802.3af. This power is delivered to a specially designed Ethernet switch that injects the power between the cable and the switching device. As a device is connected to a port on the switch, a negotiation takes place that defines the type of device and the wattage required, with low wattage currently being defined as 7.5 W, high wattage as 15.3 W. The actual wattage used by the device may vary depending upon the functions on the device in use at any given time. Other devices may use this extra wattage.

SUMMARY

One embodiment of the invention is a network device. The network device includes an incoming power port, an outgoing power port, an internal circuit, and a power storage system connected to the incoming power port, the outgoing power port and the internal circuit.

In an alternative embodiment, the device includes a power regenerator.

In another alternative embodiment, the device includes a power detector and divider.

In yet another alternative, the device includes a power splitter and the internal circuit, without a power storage system.

BRIEF DESCRIPTION OF THE DRAWINGS

Embodiments of the invention may be best understood by reading the disclosure with reference to the drawings, wherein:

FIG. 3 shows an alternative embodiment of an in-line device having a power storage system and a power regenerator.

FIG. 4 shows an alternative embodiment of an in-line device having a power storage system and a power detector and divider.

FIG. 5 shows an alternative embodiment of an in-line device having a power splitter.

FIG. 6 shows a flowchart of an embodiment of a method to provide power using an in-line device having a power regenerator.

DETAILED DESCRIPTION OF THE EMBODIMENTS

Figure 1:
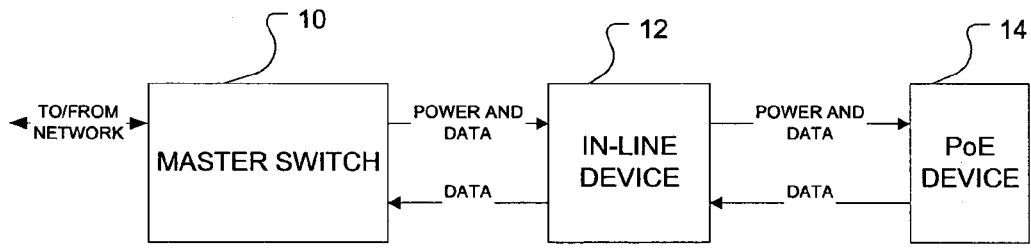
FIG. 1 shows an in-line device between a master switch and a Power over Ethernet device.

FIG. 1 shows an embodiment of a system in which an in-line device 12 lies between a master switch 10 and a Power over Ethernet (PoE) device 14. The in-line device may typically be a switch of some sort with ports to which the PoE device or devices may connect. For example, the master switch may be an IEEE 802.af switch that resides in a computer or control room. The in-line device may reside on a table in a conference room, some distance away from the master switch, the two being connected by a Cat 5 cable. Users in the conference room may have the ability to connect to the switch with powered devices, such as laptops, to receive data. In addition, a PoE device, such as a network phone, could connect to the in-line device for both power and data.

The term in-line device as used here may be one of several different types of devices. For example, the in-line device could be a hub. A hub is a passive device that does not read any of the information contained in a packet of data, it merely connects the wires from all ports to each other and the packet moves across these connections. If more than one packet enters the hub at the same time a collision occurs and the packets have to be retransmitted by the connected devices again.

The in-line device could be a switch. A switch reads the destination header information in all packets to determine their path and buffers are used to keep the packets from colliding. Most devices today are switches since the technology avoids collisions and is not very expensive, but hubs do still exist.

The in-line device could also be a router with switched ports. A router reads all of the information in a packet into a buffer and then rebuilds the packet on the outgoing interface. However, several routers on the market today have specific cards in them that act as switches. The connected devices switch their packets to the router part of the device that then routes the packets into the network. This type of device would also be capable of passing inline power.

As mentioned above, the in-line device could be something like an IP, or 'network' telephone. Some current network telephones are two Ethernet connections, one to connect the phone to the master switch and the other to connect to a PC. In the future some network phones may have more than one extra port and it may act like a small switch. A difference may lie in that the phone will use the inline power from the master switch and the extra ports will just be normal ports without power. The internal switching mechanism may be similar to the one described here, where the inline power is directed to the phone instead of an external port.

The master switch 10 provides power and data to the in-line device. The in-line device may provide power and data to the PoE device, as well as just data to other devices not requiring power. The in-line device and the master switch also provide a return path for data. The in-line device may also be referred to as a network device.

The in-line device does not have a separate power supply, but is also powered, at least in part, by the power received from the master switch. This is made possible by the provision of power up to 15.3 Watts, according to the current IEEE standard, to the in-line device. When a device is connected to a master switch that has the 15.3 W capability, the device negotiates with the master switch to define the type of device and the wattage required. Currently, for example, low wattage is 7.5 W and high wattage is 15.3 W.

While a device may negotiate for a low or high wattage, the amount of wattage actually used will vary depending upon the functions on the device in use at any given time. This allows an in-line device to utilize unused wattage when the 'downstream' device, such as 14, is not using the full wattage. It is possible that higher levels of power may be available in future standards, in which case the in-line device may be able to power itself and more than one PoE device in the future.

In order to allow the in-line device to use the excess power capacity and to have enough reserve to continue to operate, the in-line device 12 may have a power storage system. This allows the in-line device to store up power for use when the downstream device uses its full wattage, leaving no excess capacity for the in-line device. An embodiment of such a device is shown in FIG. 2.

Figure 2:
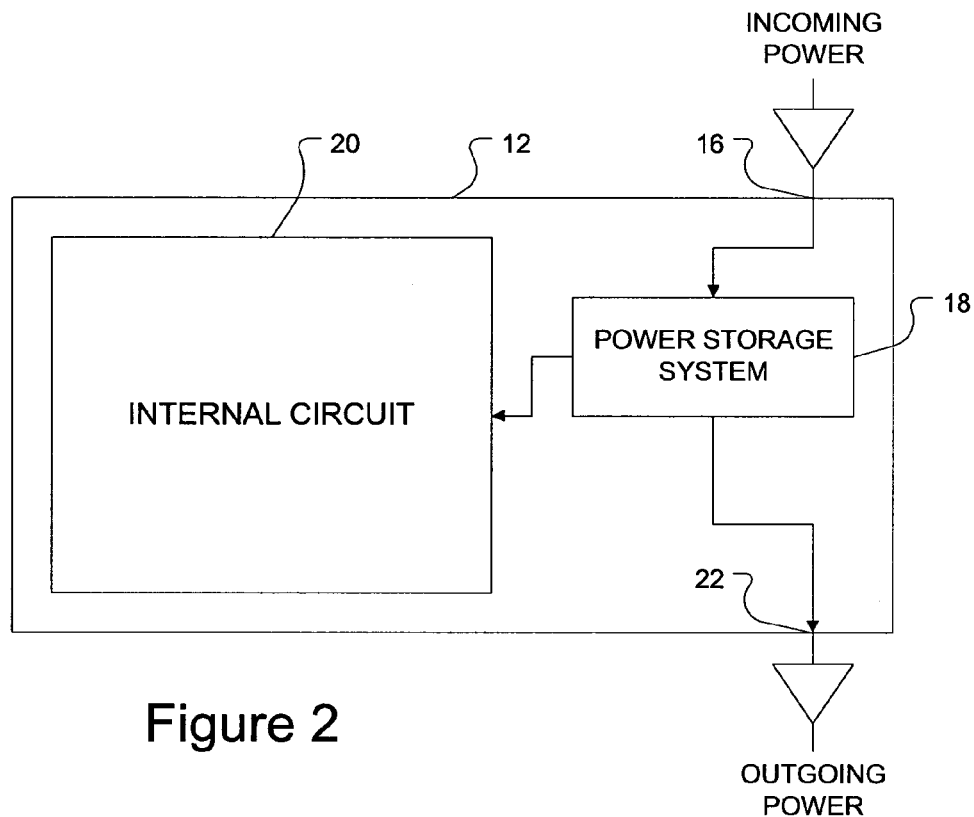
FIG. 2 shows an embodiment of an in-line device having a power storage system.

In FIG. 2, the in-line device 12 has an incoming power port 16, a power storage system 18, and an outgoing power port 22. The in-line device 12 may also include an internal circuit 20. In the example where the in-line device is a switch, the internal circuit 20 may be a switching circuit. The internal circuit 20 is powered by the incoming power, which also provides power to the outgoing port for the PoE device attached to the in-line device. The level or power provided to the outgoing port will be determined generally by the demands of the PoE device. The management of the power demands for the internal circuit 20 as well as the PoE device may be handled in several different ways. One embodiment is shown in FIG. 3.

In this particular embodiment, the incoming power is channeled through the power storage system 18. The power storage system runs both the internal circuit 20 and provides power to the outgoing power port at the high wattage level. In one example, discussed above, the high wattage level is 15.3 Watts. The power storage system, such as a capacitor, battery, set of capacitors or batteries, as examples, is constantly be drained and recharged.

Although the high wattage level is always available to the outgoing port for the PoE device, it may not always be used. Any excess is used to recharge the storage system. The power regenerator 24 pulls the power needed for the outgoing port from the storage system, and 'returns' any excess to the power storage system for recharging. A flowchart for an embodiment of power management for this example is shown in FIG. 6.

The power storage system receives the incoming power at process 30 of FIG. 6. The power regenerator provides power to the outgoing port from the power storage system at 32, and the power storage system powers the internal circuit at 34. At 36, the power storage system is being recharged as possible from any available excess power capacity. These processes will typically all be occurring simultaneously. This embodiment has an advantage in that no additional intelligence is needed to manage the power. The risk of completely draining the batteries is a little bit higher, as the high wattage continually being available to the downstream device may cause the power storage system to deplete faster than it can be recharged.

An alternative embodiment of an in-line device is shown in FIG. 4. In this particular implementation, intelligence has been added to the system to monitor and divide power for allocation to one of three demands, as possible. The power detector and divider 26 resides between the incoming and outgoing power ports 16 and 18, respectively. The power storage system 18 is connected to the incoming and outgoing ports, but only indirectly. The operation of the power detector and divider may be better understood with reference to FIG. 7.

Figure 7:
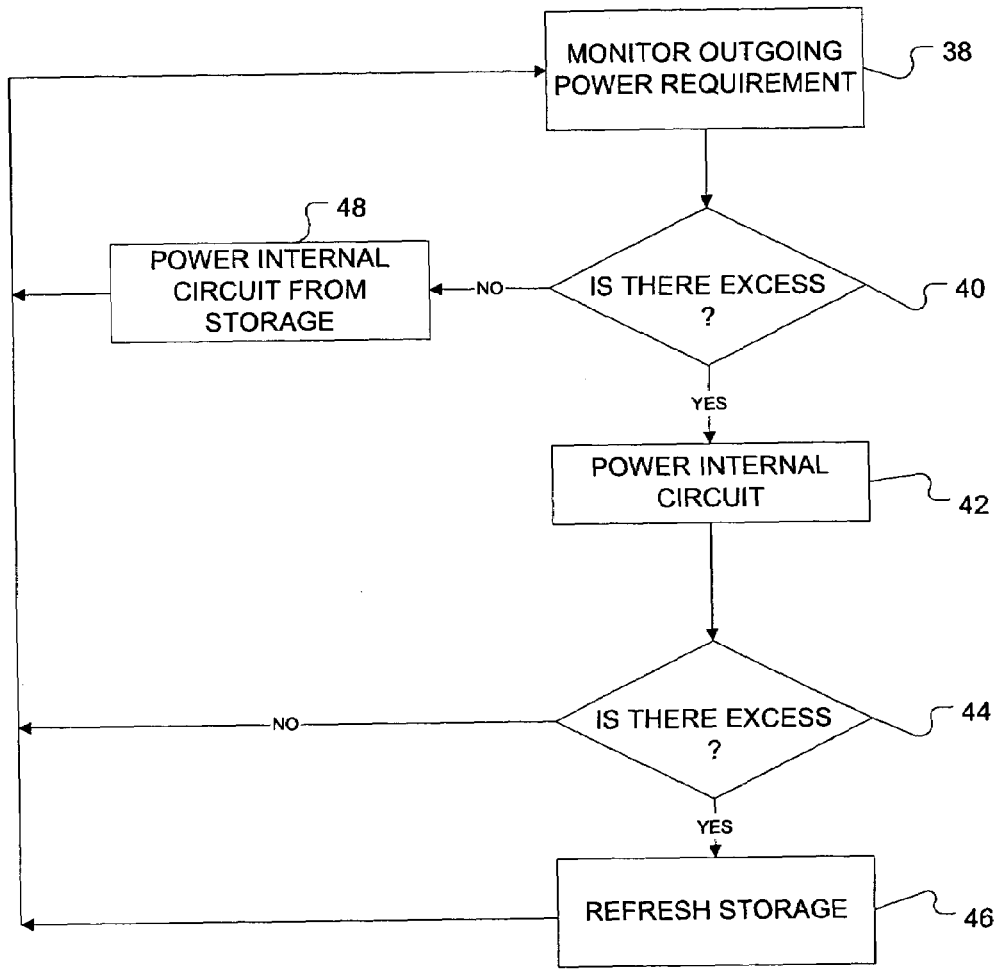
FIG. 7 shows a flowchart of an embodiment of a method to provide power using an in-line device having a power detector and a divider.

At 38 in FIG. 7, the outgoing power demands from the PoE device are monitored. If there is any excess power to those demands available at 40, the internal circuit is powered directly from the incoming power at 42. If there is no excess power, the internal circuit is powered from storage at 48. The tern 'directly' in this context means that no power needs to be drawn from the storage system. If, depending upon the power needs of the internal circuit, there is even more excess capacity at 44, the storage of the power storage system is refreshed at 46.

In general terms, then, the power detector and divider may be said to determine a first level of power, being that power required at the outgoing power port. Any excess power to the first level is then provided to the internal circuit at a second level. Finally, any power excess to the second power level is stored.

If there is no excess power at 40, the internal circuit is powered from storage. The power to the internal circuit may be provided from the incoming power, the storage system, or a combination of the two. The combination of power sources will allow as much of the incoming power to be used as possible, thereby avoiding draining the power storage system. The power storage system is used to supplement any additional power needed to power the internal circuit. This embodiment may provide longer battery life, as there is no constant level of powered required to be available to the PoE device downstream from the in-line device.

In another embodiment, the power level required by the downstream device is set as a hard limit of low wattage. In the example above, low wattage was set at 7.5 W, as an example. Some type of control may be placed on the power port of the in-line device that prevented any devices from negotiating for a high wattage. Alternatively, users would just find that devices that demand more than the low wattage setting would just not function correctly, if at all.

A device with such a limitation is shown in FIG. 5. In this embodiment, there is no power storage system, as the internal circuit would have a constant low wattage level of power available to it. A power splitter 28 would receive the power from the incoming power port and provide power at one level to the internal circuit and power at another level to the outgoing power port 22. Typically, the power levels may be the substantially equal. For example, using the values above, both the internal circuit 20 and the outgoing power port 22 would receive a constant 7.5 W of power.

Figure 8:
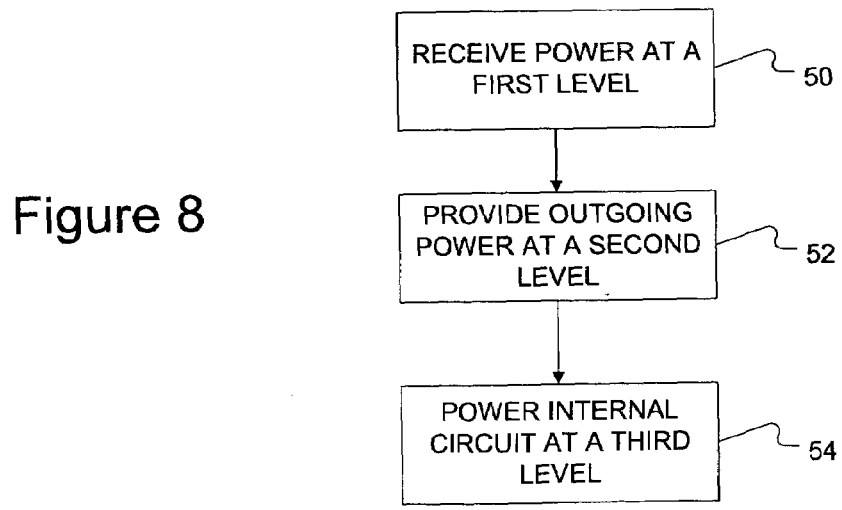
FIG. 8 shows a flowchart of an embodiment of a method to provide power using a power splitter.

A flowchart of an embodiment of a method of providing power using this type of device is shown in FIG. 8. The power is received at the power splitter at a first level at 50. Outgoing power is provided at a second level at 52 and the internal circuit is powered at a third level at 54. Typically the second and third levels will be substantially equal, and will also typically be approximately half of the first level.

As mentioned above, the relationships between the various power levels and the configuration of the devices may change with further improvements to the provision of power through networking cables. For example, the amount of power available from the master switch may increase.

An increase in the power available from the master switch increases the possible combinations of the in-line and downstream devices. In one example, varying steps of power, rather than just half steps may become possible. If one were to view the low wattage as being a step up to full power, there are two steps currently available. It is possible that the power could be managed to have more steps, or lower wattage devices developed that use less than one step of power. For example, devices could be developed that only require a quarter of the full power amount. There would now be four steps available and varying combinations of power consuming devices could be envisioned.

Further, there may be improvements to the provision of power, where the available power is doubled. This would also provide four steps of power, at the current low wattage setting. The in-line device may increase its power consumption needs. Alternatively, more devices that require power could be added to the in-line device. In yet another alternative, a device with a higher power requirement could be connected to the in-line device. The various combinations may be considered as having power requirements equivalent to 'steps.'

As can be seen from the above, the implementations of the invention depend largely upon the available power resources and the designer's requirements. As the standards for Power over Ethernet continue to involve, the embodiments of the invention can adapt and adjust to those evolutions.

Thus, although there has been described to this point particular embodiments, combinations and variations for methods and apparatuses for providing Power over Ethernet, it is not intended that such specific references be considered as limitations upon the scope of this invention except in-so-far as set forth in the following claims.

What is claimed is:

1. A network device, comprising:
   an incoming power port adapted to receive power and data;
   an outgoing power port adapted to provide power to at least one other device;
   an internal circuit adapted to receive power and data from the incoming power port; and
   a power storage system connected to the incoming power port, the outgoing power port and the internal circuit adapted to monitor power levels at the outgoing power port and to control power levels from the incoming power port and to the internal circuit responsive to the power levels at the outgoing power port.

2. The network device of claim 1, the network device comprising a power regenerator between the power storage system and the outgoing power port.

3. The network device of claim 1, the network device comprising a power detection and divider circuit between the incoming power port and the power storage system.

4. The network device of claim 1, the power storage system to:
   receive power from the incoming power port;
   power the internal circuit; and
   provide power at a predetermined level to the outgoing power port.

5. The network device of claim 2, the power regenerator to provide power at a predetermined level to the outgoing power port and the internal circuit from the power storage system.

6. The network device of claim 3, the power detection and divider circuit to:
   monitor power needed at the outgoing power port;
   provide the power needed at the outgoing power port;
   charge the power storage system, as possible; and
   power the internal circuit from the incoming power port in combination with the power storage system, as needed.

7. The network device of claim 1, the power storage system further comprising a power splitter to divide power from the incoming power port, provide power to the outgoing power port and to power the internal circuit.

8. The network device of claim 7, the power splitter to provide power to the outgoing power port at a first level substantially equal to the power from the incoming power port and to power the internal circuit at a second level substantially equal to the first level.

9. The network device of claim 7, the power splitter to provide power to the outgoing power port at a level substantially equal to 7.5 Watts, and to provide power to the internal circuit at a level substantially equal to 7.5 Watts.

10. A method of providing power to a network device, the method comprising:
    receiving power and data through an incoming power port;
    providing power at a predetermined level to an outgoing power port adapted to provide power to at least one other device;
    providing power to a power storage system; and
    providing power to an internal circuit, wherein the power provided to the internal circuit is comprised of at least a portion of excess power received at the power storage system and power stored in the power storage system.

11. The method of claim 10, wherein:
    providing power at the predetermined level to the outgoing power port further comprises determining a first power level to be provided to the outgoing power port and providing power at the first power level;
    providing power to the internal circuit further comprises providing any power excess to the first power level to the internal circuit at a second power level; and
    storing any power excess to the second power level.

12. The method of claim 11, wherein providing any power excess to the first power level further comprises providing no power excess to the first power level, and providing power at the second power level from the power storage system.

13. The method of claim 11, wherein storing any power excess to the second power level further comprises storing excess power at a third power level.

14. The method of claim 10, further comprising:
    receiving power further comprises receiving power at a first level at a power splitter;
    providing power at the predetermined level to the outgoing power port further comprises providing power to the outgoing power port at a second power level equal to half of the predetermined level; and
    providing power to the internal circuit further comprises providing power to the internal circuit at a third power level equal o the second power level.

15. A network device, comprising:
    a means for receiving power and data;
    a means for providing power to at least one other device;
    an internal means for receiving power and data from the means for receiving; and
    a means for:
        monitoring power levels at the means for providing power; and
        controlling power levels from the means for receiving and to the internal means responsive to the power levels at the means for providing.

* * * * *

UNITED STATES PATENT AND TRADEMARK OFFICE
CERTIFICATE OF CORRECTION

PATENT NO. : 7,152,168 B2
APPLICATION NO. : 10/636135
DATED : December 19, 2006
INVENTOR(S) : Scott Anthony Boynton and Kenneth Craig Coley It is certified that error appears in the above-identified patent and that said Letters Patent is hereby corrected as shown below:

At column 6, line 51, please replace "level equal o the second power" with --level equal to the second power--

Signed and Sealed this

Eighteenth Day of September, 2007

JON W. DUDAS
*Director of the United States Patent and Trademark Office*